Nov. 22, 1955 H. B. REX 2,724,807
FREQUENCY-SELECTIVE SYSTEMS
Filed Feb. 16, 1950
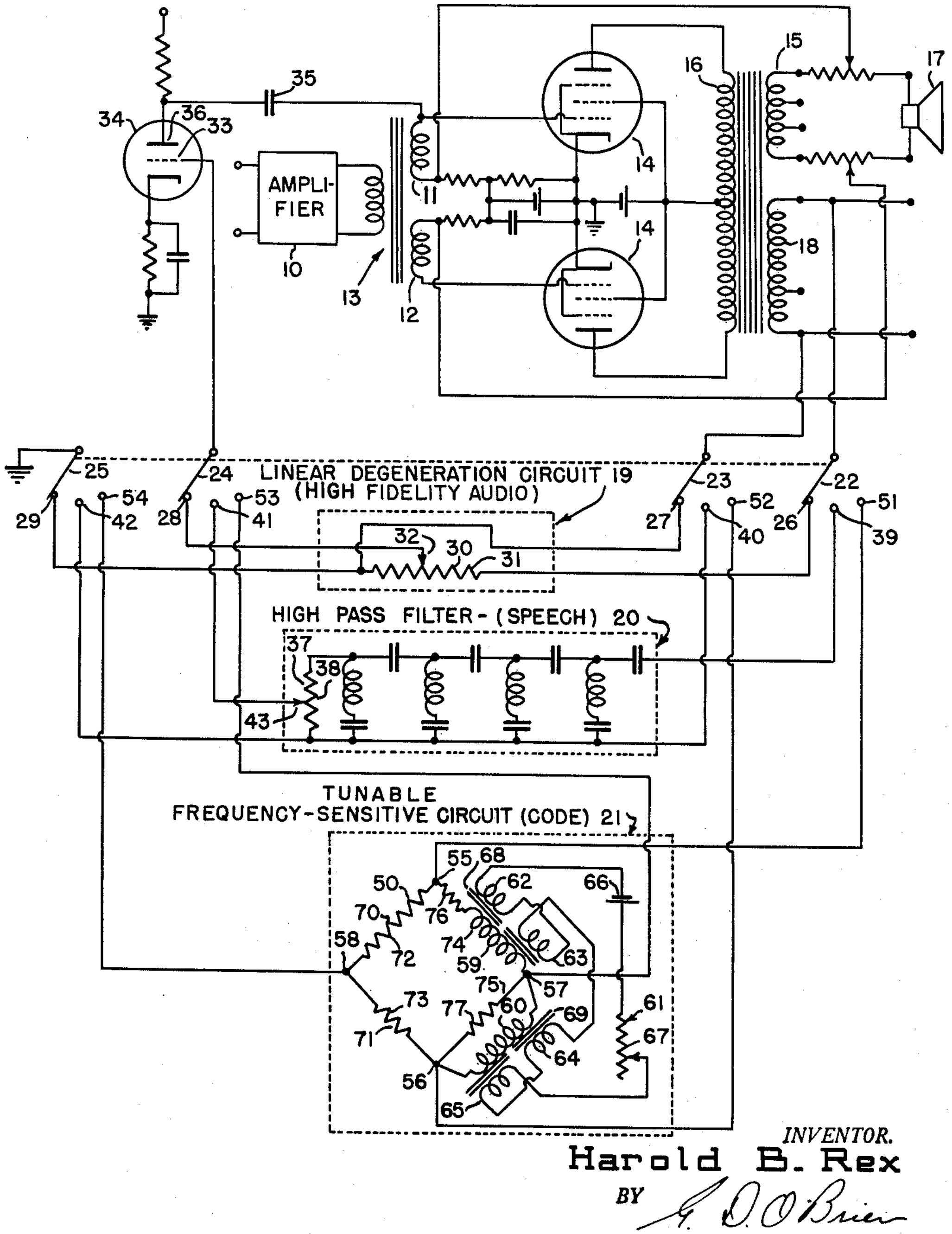
INVENTOR.
Harold B. Rex
BY G. D. O'Brien
ATTORNEY

United States Patent Office 2,724,807

Patented Nov. 22, 1955

2,724,807

FREQUENCY-SELECTIVE SYSTEMS

Harold B. Rex, Falls Church, Va.

Application February 16, 1950, Serial No. 144,566

2 Claims. (Cl. 333—74)

(Granted under Title 35, U. S. Code (1952), sec. 266)

The invention relates to improvements in frequency-selective amplifier systems and to tunable circuits suitable for use in such systems.

An important object of the invention is to provide an electronic audio-frequency amplifier including a frequency-selective negative feedback system.

Another object of the invention is the provision of a frequency-sensitive bridge having electrical means for rapidly changing its selective or balance frequency.

A further object of the invention is the provision of an inductance with electrical means for rapidly changing its reactance.

Other objects and advantages of the invention will be apparent during the course of the following description, taken in connection with the accompanying drawing forming a part of this specification.

The single figure of the drawing is a diagrammatic view of the improved frequency-selective system including the electrically-tunable frequency-sensitive bridge.

Referring to the drawing, 10 designates an audio amplifier whose output is coupled through dual secondary windings 11, 12 of a transformer 13 to a push-pull amplifier 14. In the audio-frequency amplification system shown, this amplifier 14 is coupled through one secondary winding 15 of a dual output transformer 16 to a loud speaker 17 and through another secondary winding 18 selectively to any one of a plurality of frequency-selective degenerative circuits 19—21 by ganged triple-throw switches 22—25.

The linear degeneration circuit 19 is for high fidelity audio amplification in a frequency spectrum between 30 and 20,000 C. P. S. When the switches 22—25 are closed on contacts 26—29, as shown, the resistor 30 of a variable pickoff rheostat 31 is connected across the output winding 18 of the transformer 16 and voltage from the rheostat tap 32 is impressed on the control grid 33 of a vacuum tube amplifier 34. This tube 34 shifts the phase of the degenerative current 180° so that, through a capacitative coupling 35 between its plate 36 and the secondary winding 11 of transformer 13, the degenerative current will oppose the output of the amplifier 10.

The high-pass inductance-capacitance filter circuit 20 is for speech frequencies between 300 and 2500 C. P. S. Paralleling this filter circuit is the resistor 37 of a variable-pickoff rheostat 38. When the switches 22—25 are closed on contacts 39—42, the filter 20 and resistor 37 are connected across the output winding 18 of the transformer 16 and voltage from the rheostat tap 43 is impressed on the control grid 33 of the tube 34. The output of the tube 34 therefore is such that it depresses certain high-frequency components of the output of amplifier 10.

The degenerative circuit 21 contains a tunable frequency-selective or frequency-sensitive bridge 50. This circuit is useful in code signalling in a frequency band only a few cycles wide. When the switches 22—25 are closed on contacts 51—54 the input terminals 55, 56 of the bridge are connected across the transformer output winding 18 and voltage across the output terminals 57, 58 of the bridge is impressed on the control grid 33 of the tube 34. When frequencies equal to its balance frequency are received by the bridge, there will be no output from the bridge affecting tube 34 and therefore no degeneration. However, for all other frequencies, the bridge will develop an output voltage effective to degenerate these other frequencies.

The balance frequency of a conventional resistance-capacitance Wien bridge has previously been varied by mechanical adjustment of its resistor or condenser components. The bridge 50 is a modification of the Wien bridge wherein equal inductances 59, 60 are substituted for the usual Wien bridge condensers. Electrical tuning means 61 is provided including differentially-connected inductances 62, 63 and 64, 65, energized by a source 66 of direct current under the control of a rheostat 67 so as to act on the inductances 59, 60 and thereby vary the saturation of their cores 68, 69. Thus the natural frequency of the bridge may be rapidly changed so as to scan a portion of the frequency spectrum without mechanical manipulation. Alternating voltages are induced in the inductances 62, 63 and 64, 65 from the inductances 59, 60 but these induced voltages tend to cancel out because the windings are connected in opposition.

Two adjacent arms 70, 71 of the bridge 50 include only resistors 72, 73 respectively. The resistance of the resistor 72 is preferably twice that of the resistor 73. The other two adjacent arms 74, 75 include both resistance and inductance, viz: arm 74 comprises inductance 59 in series with resistor 76 and arm 75 comprises inductance 60 in parallel with resistor 77. The resistors 76, 77 have equal resistance.

Let R represent the resistance of the resistors 76, 77; let $R_1$ represent the resistance of the resistor 73, let L represent the inductance of the inductances 59, 60. Let $Z_a$, $Z_b$ represent the respective impedances of the arms 74, 75. And let $f$ represent the sensitive or balance frequency, $e_1$ the bridge input voltage and $e_2$ the bridge output voltage. Then, $$\frac{e_2}{e_1}=\frac{R_1}{3R_1}-\frac{Z_b}{Z_a+Z_b}=\frac{1}{3}-\frac{Z_b}{Z_a+Z_b}$$

Furthermore, $$Z_a=R+j\omega L$$

And $$Z_b=\frac{1}{\frac{1}{R}+\frac{1}{j\omega L}}$$

Wherein the angular velocity $\omega=Z\pi f$ and $j=\sqrt{-1}$. But when $e_2=0$ the bridge is balanced and $Z_a=2Z_b$. Then $$R+j\omega L=2\frac{1}{\frac{1}{R}+\frac{1}{j\omega L}}=2\frac{j\omega RL}{R+j\omega L}$$

$$(R+j\omega L)^2=2j\omega RL$$

$$R^2+2j\omega RL-\omega^2L^2=2j\omega RL$$

$$R^2=\omega^2L^2$$

$$R=\omega L$$

$$\omega=\frac{R}{L}$$

$$f=\frac{R}{2\pi L}$$

But $L=Cn^2\mu$ where $n$ is the number of turns in the inductance and $\mu$ is the permeability. Thus, $$f=\frac{KR}{2\pi n^2\mu}$$

From the foregoing it is clear that the null or balance point of the bridge may be changed by correspondingly varying the permeability of the equal inductances 59, 60 as well as by varying the resistance of the resistors 76, 77. It is also clear that the balance frequency of the bridge varies as the reciprocal of the permeability of the inductances. Practically, this means that if the permeability of the inductances is changed in the order of 100 to 1, the frequency of an oscillator or tuned circuit based on this analog of the Wien bridge will be changed over a 100 to 1 frequency range without requiring mechanical motion for the frequency adjustment.

Various changes may be made in the form of invention herein shown and described without departing from the spirit of the invention or the scope of the following claims.

The invention described herein may be manufactured and used by or for the Government of the United States of America for governmental purposes without the payment of any royalties thereon or therefor.

What is claimed is:

1. The combination of a frequency-selective bridge having first and second adjacent resistive arms, the resistance of the first arm being twice that of the second arm, third and fourth arms adjacent each other and respectively adjacent the first and second arms, the third arm comprising a resistor and an inductor in series and the fourth arm comprising a resistor and an inductor in parallel, the resistances of said series and parallel resistors being equal and the inductances of said inductors being both of a given value whereby the bridge is normally in balance at a fixed frequency, said inductors having saturable cores, and means adapted to simultaneously vary the permeability of said cores to equally vary the inductances thereof so that the bridge may be balanced at any one of a number of different frequencies, bridge input being applied across the junction of the first and third arms and the junction of the second and fourth arms, and bridge output being taken across the junction of the first and second arms and the junction of the third and fourth arms.

2. The combination comprising a frequency-selective bridge having first and second adjacent resistive arms, the resistance of the first arm being twice that of the second arm, third and fourth arms adjacent each other and respectively adjacent the first and second arms, the third arm comprising a resistor and an inductor in series and the fourth arm comprising a resistor and an inductor in parallel, the resistances of said series and parallel resistors being equal and the inductances of said inductors being both of a given value whereby the bridge is normally in balance at a fixed frequency, bridge input being applied across the junction of the first and third arms and the junction of the second and fourth arms, and bridge output being taken across the junction of the first and second arms and the junction of the third and fourth arms, said inductors having saturable cores, a pair of control windings wound on the saturable core of each of said inductors, a direct current source connected to both pairs of control windings in series, each separate pair of control windings being connected in series opposition.

References Cited in the file of this patent

UNITED STATES PATENTS

| | | |
|---|---|---|
| 1,227,302 | Osnos | May 22, 1917 |
| 1,611,223 | Nyquist | Dec. 21, 1926 |
| 1,824,577 | Sorensen | Sept. 22, 1931 |
| 2,078,880 | Logan | Apr. 27, 1937 |
| 2,258,128 | Black | Oct. 7, 1941 |
| 2,395,515 | Stoller | Feb. 26, 1946 |
| 2,397,625 | Roche et al. | Apr. 2, 1946 |
| 2,409,610 | Bixby | Oct. 22, 1946 |
| 2,413,263 | Suter | Dec. 24, 1946 |
| 2,432,399 | Edwards | Dec. 9, 1947 |
| 2,447,338 | Hornfeck | Aug. 17, 1948 |
| 2,459,046 | Rieke | Jan. 11, 1949 |
| 2,480,163 | Romander | Aug. 30, 1949 |
| 2,487,675 | Rutherford | Nov. 8, 1949 |
| 2,552,952 | Gachet et al. | May 15, 1951 |
| 2,588,155 | Ofverholm et al. | Mar. 4, 1952 |

OTHER REFERENCES

Hague: Alternating Current Bridge Methods, 4th edition, published in 1938 by Pitman Publishing Corp., N. Y. pages 322–327. (Copy in Scientific Library.)